US011845869B2

(12) United States Patent
Hong et al.

(10) Patent No.: US 11,845,869 B2
(45) Date of Patent: Dec. 19, 2023

(54) METHOD FOR PRODUCING THIXOTROPIC CURABLE SILICONE COMPOSITION

(71) Applicants: DOW SILICONES CORPORATION, Midland, MI (US); DOW TORAY CO., LTD., Tokyo (JP)

(72) Inventors: Debo Hong, Shanghai (CN); Xiucuo Li, Shanghai (CN); Kazutoshi Okabe, Ichiarah (JP); Hiroshi Adachi, Ichihara (JP); Lei Fang, Shanghai (CN); Qi Chen, Shanghai (CN)

(73) Assignees: DOW SILICONES CORPORATION, Midland, MI (US); DOW TORAY CO., LTD., Tokyo (JP)

( * ) Notice: Subject to any disclaimer, the term of this patent is extended or adjusted under 35 U.S.C. 154(b) by 13 days.

(21) Appl. No.: 17/620,687

(22) PCT Filed: Jun. 21, 2019

(86) PCT No.: PCT/CN2019/092283
§ 371 (c)(1),
(2) Date: Dec. 18, 2021

(87) PCT Pub. No.: WO2020/252772
PCT Pub. Date: Dec. 24, 2020

(65) Prior Publication Data
US 2022/0267531 A1    Aug. 25, 2022

(51) Int. Cl.
| | | |
|---|---|---|
| *C09D 183/04* | (2006.01) | |
| *C08G 77/18* | (2006.01) | |
| *C08K 3/22* | (2006.01) | |
| *C08K 3/36* | (2006.01) | |
| *C08K 5/5415* | (2006.01) | |
| *C08K 5/544* | (2006.01) | |
| *C08K 5/549* | (2006.01) | |
| *C08K 3/26* | (2006.01) | |

(52) U.S. Cl.
CPC .......... *C09D 183/04* (2013.01); *C08G 77/18* (2013.01); *C08K 3/22* (2013.01); *C08K 3/36* (2013.01); *C08K 5/544* (2013.01); *C08K 5/549* (2013.01); *C08K 5/5415* (2013.01); *C08K 2003/2224* (2013.01); *C08K 2003/2227* (2013.01); *C08K 2003/2237* (2013.01); *C08K 2003/2265* (2013.01); *C08K 2003/265* (2013.01); *C08K 2003/267* (2013.01); *C08K 2201/006* (2013.01)

(58) Field of Classification Search
CPC ...... C08L 83/04; C09D 183/04; C09J 183/04; H01L 23/296
See application file for complete search history.

(56) References Cited

U.S. PATENT DOCUMENTS

| | | |
|---|---|---|
| 4,618,646 A | 10/1986 | Takago et al. |
| 4,687,829 A | 8/1987 | Chaffee et al. |
| 4,711,928 A | 12/1987 | Lee et al. |
| 4,772,675 A | 9/1988 | Klosowski et al. |
| 4,871,827 A | 10/1989 | Klosowski et al. |
| 4,888,404 A | 12/1989 | Klosowski et al. |
| 4,898,910 A | 2/1990 | Kamis et al. |
| 5,036,131 A | 7/1991 | Himstedt |
| 5,457,148 A | 10/1995 | Lucas |
| 5,563,210 A | 10/1996 | Donatelli et al. |
| 6,121,368 A | 9/2000 | Heying et al. |
| 6,251,990 B1 | 6/2001 | Meguriya et al. |
| 6,265,480 B1 | 7/2001 | Enami et al. |
| 7,592,383 B2 | 9/2009 | Fukui |
| 7,955,696 B2 | 6/2011 | Baikerikar et al. |
| 8,101,677 B2 | 1/2012 | Nishiumi et al. |
| 8,957,153 B2 | 2/2015 | Kodama et al. |
| 9,079,801 B2 | 7/2015 | Lodyga et al. |
| 9,732,239 B2 | 8/2017 | Clapp et al. |
| 9,944,742 B2 | 4/2018 | Saxena et al. |
| 9,994,754 B2 | 6/2018 | Clough |
| 10,072,151 B2 | 9/2018 | Kodama et al. |

(Continued)

FOREIGN PATENT DOCUMENTS

| | | |
|---|---|---|
| CN | 101346439 A | 1/2009 |
| CN | 102675882 A | 9/2012 |

(Continued)

OTHER PUBLICATIONS

Handbook of Fillers published by ChemTec Publishing @2016 Chapter 5, p. 316.*
Machine assisted English translation of JP2009235265 obtained from https://patents.google.com/patent on Apr. 1, 2022, 11 pages.
Machine assisted English translation of JP2008156578 obtained from https://patents.google.com/patent on Apr. 1, 2022, 10 pages.
Machine assisted English translation of CN104004357 obtained from https://patents.google.com/patent on Apr. 1, 2022, 10 pages.
Machine assisted English translation of JP2005171189 obtained from https://patents.google.com/patent on Apr. 1, 2022, 6 pages.

(Continued)

*Primary Examiner* — Marc S Zimmer
(74) *Attorney, Agent, or Firm* — WARNER NORCROSS + JUDD LLP

(57) ABSTRACT

A method for producing a thixotropic curable silicone composition is provided. The curable silicone composition comprises: (A) a silicone base material comprising: an organopolysiloxane having at least two alkoxysilyl-containing groups per molecule and a filler other than fumed silica; (B) a hydrophobic fumed silica; (C) a carbasilatrane derivative; (D) an alkoxysilane or its partial hydrolysis and condensation product; and (E) a condensation reaction catalyst. The method comprises the following steps: (I) mixing components (A) and (B); (II) mixing component (C) with a mixture obtained by step (I); and (III) mixing components (D) and (E) with a mixture obtained by step (II) under free of moisture. The curable silicone composition obtained by the method has an excellent thixotropic property and can cure at room temperature by contact with moisture in air.

8 Claims, No Drawings

(56) References Cited

U.S. PATENT DOCUMENTS

| | | | |
|---|---|---|---|
| 10,358,542 B2* | 7/2019 | Fujisawa | C08K 5/56 |
| 2001/0034403 A1 | 10/2001 | Takuman et al. | |
| 2004/0110077 A1 | 6/2004 | Yachi et al. | |
| 2006/0247349 A1 | 11/2006 | Kollmann et al. | |
| 2008/0242763 A1 | 10/2008 | Ramakrishnan et al. | |
| 2008/0300358 A1 | 12/2008 | Cook et al. | |
| 2009/0281222 A1 | 11/2009 | Nishiumi et al. | |
| 2009/0291238 A1 | 11/2009 | Scott et al. | |
| 2009/0298982 A1 | 12/2009 | Meyer et al. | |
| 2011/0163460 A1 | 7/2011 | Kato et al. | |
| 2013/0065983 A1 | 3/2013 | Ono et al. | |
| 2014/0060903 A1 | 3/2014 | Hamada et al. | |
| 2014/0242149 A1 | 8/2014 | Gantner et al. | |
| 2014/0288246 A1* | 9/2014 | Ota | C08G 77/38 252/183.11 |
| 2015/0051345 A1 | 2/2015 | Fang et al. | |
| 2015/0232666 A1 | 8/2015 | Ono et al. | |
| 2016/0017185 A1 | 1/2016 | Albaugh et al. | |
| 2017/0029671 A1 | 2/2017 | Sawanobori et al. | |
| 2017/0058103 A1 | 3/2017 | Fujisawa et al. | |
| 2017/0121462 A1 | 5/2017 | Fujisawa et al. | |
| 2020/0123427 A1 | 4/2020 | Endo et al. | |
| 2020/0347229 A1 | 11/2020 | Fujisawa et al. | |
| 2021/0225720 A1 | 7/2021 | Sutoh | |
| 2023/0083453 A1* | 3/2023 | Zampella | C08L 83/06 |

FOREIGN PATENT DOCUMENTS

| | | |
|---|---|---|
| CN | 103819900 A | 5/2014 |
| CN | 103923464 A | 7/2014 |
| CN | 103937257 A | 7/2014 |
| CN | 104004357 A | 8/2014 |
| CN | 104312528 A | 1/2015 |
| CN | 104479364 A | 4/2015 |
| CN | 105018021 A | 11/2015 |
| CN | 105713552 A | 6/2016 |
| CN | 105838319 A | 8/2016 |
| CN | 106221239 A | 12/2016 |
| CN | 106751908 A | 5/2017 |
| CN | 106753217 A | 5/2017 |
| EP | 0234271 A2 | 9/1987 |
| EP | 1134256 A1 | 9/2001 |
| EP | 1927636 A1 | 6/2008 |
| GB | 2284214 A | 5/1995 |
| JP | H05140456 A | 6/1993 |
| JP | 2001139818 A | 5/2001 |
| JP | 2001192641 A | 7/2001 |
| JP | 2004292724 A | 10/2004 |
| JP | 2005171189 A | 6/2005 |
| JP | 3831481 B2 | 10/2006 |
| JP | 2008156578 A | 7/2008 |
| JP | 2009235265 A | 10/2009 |
| JP | 2009235279 A | 10/2009 |
| JP | 2010100665 A | 5/2010 |
| JP | 2011089079 A | 5/2011 |
| JP | 2011178821 A | 9/2011 |
| JP | 2012144704 A | 8/2012 |
| JP | 2015071662 A | 4/2015 |
| WO | 2007037552 A2 | 4/2007 |
| WO | 2007117552 A1 | 10/2007 |
| WO | 2013058293 A1 | 4/2013 |
| WO | 2013137423 A1 | 9/2013 |
| WO | 2015155949 A1 | 10/2015 |
| WO | 2015155950 A1 | 10/2015 |
| WO | 2016038836 A1 | 3/2016 |
| WO | 2018043270 A1 | 3/2018 |
| WO | 2019054371 A1 | 3/2019 |
| WO | 2020252772 A1 | 12/2020 |
| WO | 2020252773 A1 | 12/2020 |

OTHER PUBLICATIONS

Machine assisted English translation of CN103819900 obtained from https://patents.google.com/patent on Apr. 11, 2022, 11 pages.

International Search Report for PCT/CN2019/092285 dated Mar. 24, 2020, 5 pages.

International Search Report for PCT/CN2019/092283 dated Mar. 23, 2020, 5 pages.

Machine assisted English translation of JP2011178821 obtained from https://patents.google.com/patent on Mar. 28, 2022, 11 pages.

Machine assisted English translation of JP2015071662 obtained from https://patents.google.com/patent on Mar. 28, 2022, 11 pages.

Machine assisted English translation of CN102675882 obtained from https://patents.google.com/patent on Mar. 28, 2022, 10 pages.

Machine assisted English translation of CN104312528 obtained from https://patents.google.com/patent on Mar. 28, 2022, 8 pages.

Machine assisted English translation of CN103923464 obtained from https://patents.google.com/patent on Mar. 29, 2022, 9 pages.

Machine assisted English translation of JP2001139818 obtained from https://patents.google.com/patent on Mar. 29, 2022, 7 pages.

Machine assisted English translation of CN106221239 obtained from https://patents.google.com/patent on Mar. 29, 2022, 8 pages.

Machine assisted English translation of JPH05140456 obtained from https://patents.google.com/patent on Mar. 29, 2022, 7 pages.

Machine assisted English translation of JP2010100665 obtained from https://patents.google.com/patent on Mar. 29, 2022, 7 pages.

Machine assisted English translation of JP2011089079 obtained from https://patents.google.com/patent on Mar. 29, 2022, 10 pages.

Machine assisted English translation of CN106753217 obtained from https://patents.google.com/patent on Mar. 29, 2022, 10 pages.

Machine assisted English translation of CN106751908 obtained from https://patents.google.com/patent on Mar. 30, 2022, 10 pages.

Machine assisted English translation of CN103937257 obtained from https://patents.google.com/patent on Mar. 30, 2022, 10 pages.

Machine assisted English translation of CN104479364 obtained from https://patents.google.com/patent Apr. 15, 2022, 9 pages.

Machine assisted English translation of CN105838319 obtained from https://patents.google.com/patent on Mar. 30, 2022, 9 pages.

Machine assisted English translation of CN105713552 obtained from https://patents.google.com/patent on Mar. 30, 2022, 8 pages.

Machine assisted English translation of CN105018021 obtained from https://patents.google.com/patent on Apr. 1, 2022, 4 pages.

Machine assisted English translation of WO2016038836 obtained from https://patents.google.com/patent on Apr. 1, 2022, 21 pages.

Machine assisted English translation of JP3831481 obtained from https://patents.google.com/patent on Apr. 1, 2022, 10 pages.

Machine assisted English translation of JP2001192641A obtained from https://worldwide.espacenet.com/patent on Jul. 13, 2023, 8 pages.

Machine assisted English translation of JP2004292724A obtained from https://worldwide.espacenet.com/patent on Jul. 13, 2023, 6 pages.

Machine assisted English translation of JP2009235279A obtained from https://worldwide.espacenet.com/patent on Jul. 13, 2023, 6 pages.

* cited by examiner

METHOD FOR PRODUCING THIXOTROPIC CURABLE SILICONE COMPOSITION

CROSS-REFERENCE TO RELATED APPLICATIONS

This application is the U.S. National Stage of and claims priority to International Application No. PCT/CN2019/092283 filed on 21 Jun. 2019, the content of which is incorporated herein by reference.

TECHNICAL FIELD

The present invention relates to a method for producing a thixotropic curable silicone composition that can cure at room temperature by contact with moisture in air.

BACKGROUND ART

Room temperature-curable silicone compositions, which can cure by contact with moisture in air, are used as sealants, adhesives, or coatings of an electric/electronic apparatus because they do not require heating to cure. In a specific application, a thixotropic property of the curable silicone composition is needed to make its shape kept after dispensing it. It is well-known that the thixotropic property of the curable silicone composition is generally obtained by adding fine filler such as hydrophobic fumed silica, and some kinds of organic liquid compounds having polar groups, such as silanol groups, epoxy groups, amine groups, or polyether groups.

For example, Patent Document 1 discloses a room temperature-curable silicone composition comprising: a diorganopolysiloxane end-blocked at both molecular chain terminals with silanol groups; an organosilicon compound having hydrolyzable groups; a filler; and a silicone-modified polyoxyalkylene compound.

Patent Document 2 discloses a method of making a thixotropic silicone dispersion consisting essentially of mixing a hydroxyl endblocked dimethylpolysiloxane, a hydroxyl endblocked diorganosiloxane oligomer having phenyl group or 3,3,3-trifluoropropyl group; then admixing untreated fumed silica, then admixing aluminum trihydrate powder, then (D) admixing non-reactive solvent, then admixing in the absence of moisture, a moisture activated crosslinking system for the dimethylpolysiloxane.

Patent Document 3 discloses a room temperature-curable silicone composition comprising: an organopolysiloxane having on silicon atoms in the molecular chain in one molecule at least two specific alkoxysilyl-containing groups; an organopolysiloxane having on silicon atom in the molecular chain neither a hydroxyl group nor an alkoxy group; an alkoxysilane or its partial hydrolysis and condensation product; a condensation reaction catalyst; and optionally comprises an adhesion promoter and/or a reinforcing filler.

However, the aforementioned compositions have insufficient thixotropic property. Due to the insufficient thixotropic property of the compositions, there are problems that the compositions spread on undesirable area of the electric/electronic apparatus when they cure.

PRIOR ART DOCUMENTS

Patent Documents

Patent Document 1: U.S. Pat. No. 4,618,646 A
Patent Document 2: U.S. Pat. No. 5,036,131 A
Patent Document 3: U.S. Pat. No. 8,957,153 B2

SUMMARY OF INVENTION

Technical Problem

An object of the present invention is to provide a method for producing a thixotropic curable silicone composition which has an excellent thixotropic property and can cure at room temperature by contact with moisture in air.

Solution to Problem

The method of the present invention for producing a thixotropic curable silicone composition comprising:
(A) a silicone base material comprising: 100 parts by mass of an organopolysiloxane having in a molecule at least two alkoxysilyl-containing groups represented by the following formula:

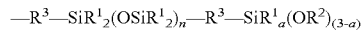

wherein $R^1$ are the same or different alkyl groups with 1 to 6 carbon atoms, $R^2$ are the same or different alkyl groups with 1 to 3 carbon atoms, $R^3$ are the same or different alkylene groups with 2 to 6 carbon atoms, "a" is 0 or 1, and "n" is an integer of from 1 to 10; and from 100 to 500 parts by mass of filler other than fumed silica;
(B) a hydrophobic fumed silica with a BET specific surface area of from 100 to 400 m²/g;
(C) a carbasilatrane derivative represented by the following general formula:

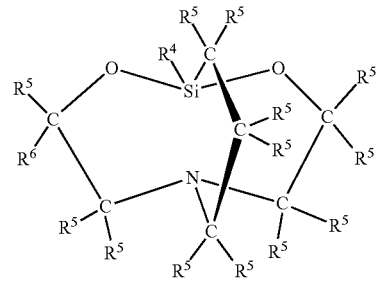

wherein $R^4$ is an alkyl group with 1 to 6 carbon atoms or an alkoxy group with 1 to 3 carbon atoms, $R^5$ are the same or different hydrogen atoms or alkyl groups with 1 to 6 carbon atoms, and $R^6$ are the same or different and are selected from groups represented by the following general formulae:

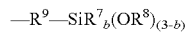

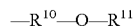

wherein $R^7$ is an alkyl group with 1 to 6 carbon atoms, $R^8$ is an alkyl group with 1 to 3 carbon atoms, $R^9$ is an alkylene group with 2 to 6 carbon atoms or an alkylenoxyalkylene group with 4 to 12 carbon atoms, $R^{10}$ is an alkylene group with 2 to 6 carbon atoms, $R^{11}$ is an alkyl group with 1 to 6 carbon atoms, an alkenyl group with 2 to 6 carbon atoms or an acyl group with 2 to 6 carbon atoms, and "b" is 0, 1 or 2;
(D) an alkoxysilane or its partial hydrolysis and condensation product, wherein the alkoxysilane is represented by the following general formula:

wherein $R^2$ is an alkyl groups with 1 to 6 carbon atoms, $R^{13}$ is an alkyl group with 1 to 3 carbon atoms, and "c" is 0, 1 or 2; and (E) a condensation reaction catalyst, wherein a content of component (B) is in an amount of from 0.1 to 50 parts by mass, a content of component (C) is in an amount of from 0.1 to 20 parts by mass, a content of component (D) is in an amount of from 0.5 to 30 parts by mass, and a content (E) is in an amount of from 0.1 to 10 parts by mass, relative to 100 parts by mass of the organopolysiloxane in component (A), respectively, and wherein the method comprises the following steps:
 (I) mixing components (A) and (B), then
 (II) mixing component (C) with a mixture obtained by said step (I), and then
 (III) mixing components (D) and (E) with a mixture obtained by said step (II) under free of moisture.

The filler in component (A) is typically selected from iron oxide, titanium oxide, aluminum oxide, zinc oxide, aluminum hydroxide, magnesium hydroxide, fused silica, crystalline silica, quart, diatomaceous earth, calcium carbonate, magnesium carbonate, zinc carbonate or a mixture thereof.

Component (A) is typically prepared by mixing the organopolysiloxane and the thermal conductive filler, in the present of a surface treating agent, under heating at 60 to 250° C.

The surface treating agent is typically a hexamethyl disilazane, a tetramethyl divinyl disilazane, or a vinyl trimethoxysilane.

Component (C) is typically a carbasilatrane derivative represented by the following formula:

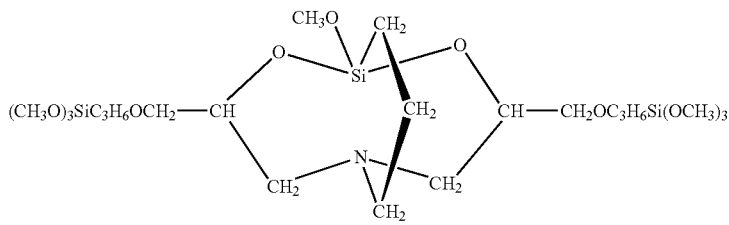

The step I is typically carried out at 10 to 50° C.
The step II is typically carried out at 10 to 50° C.
The step III is typically carried out at 10 to 50° C.

Effects of Invention

According to the method of the present invention, the curable silicone composition obtained by the method has an excellent thixotropic property and can cure at room temperature by contact with moisture in air.

Definitions

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

DETAILED DESCRIPTION OF THE INVENTION

The method of the present invention for producing a curable silicone composition will be explained in detail.

The curable silicone composition obtained by the method of the present invention, comprises:
(A) a silicone base material comprising: an organopolysiloxane and filler other than fumed silica;
(B) a hydrophobic fumed silica;
(C) a carbasilatrane derivative;
(D) an alkoxysilane or its partial hydrolysis and condensation product; and
(E) a condensation reaction catalyst.

Component (A) is an organopolysiloxane in a molecule at least two alkoxysilyl-containing groups represented by the following formula:

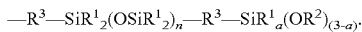

In the formula, $R^1$ are the same or different alkyl groups with 1 to 6 carbon atoms. The alkyl groups are exemplified by methyl groups, ethyl groups, propyl groups, butyl groups, pentyl groups and heptyl groups, however, methyl groups are preferred from the perspective of economic efficiency and heat resistance.

In the formula, $R^2$ are the same or different alkyl groups with 1 to 3 carbon atoms. The alkyl groups are exemplified by methyl groups, ethyl groups and propyl groups, however, methyl groups are preferred from the perspective of curability of the composition.

In the formula, $R^3$ are the same or different alkylene groups with 2 to 6 carbon atoms. The alkylene groups are exemplified by ethylene groups, methylethylene groups, propylene groups, butylene groups, pentylene groups and heptylene groups, however, ethylene groups and propylene groups are preferred from the perspective of economic efficiency and heat resistance.

In the formula, "a" is 0 or 1, and is preferably 0.

In the formula, "n" is an integer of from 1 to 10, and is preferably 1.

The alkoxysilyl-containing group can be exemplified by the groups represented by the following formulae:

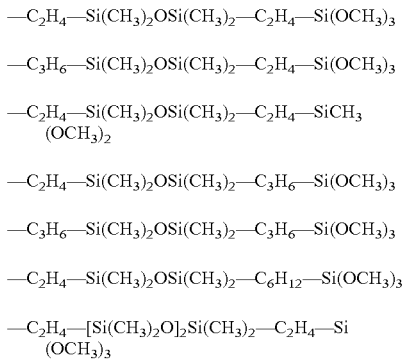

Silicon atom-bonded organic groups other than the alkoxysilyl-containing groups mentioned above in the organopolysiloxane are not limited, however, are exemplified by monovalent hydrocarbon groups with 1 to 12 carbon atoms free aliphatic unsaturated bond. The monovalent hydrocarbon groups are exemplified by methyl groups, ethyl groups, propyl groups, or similar alkyl group; phenyl groups, tolyl groups, xylyl groups, or similar aryl groups; benzyl groups, phenethyl groups, or similar aralkyl groups; and 3-chloropropyl groups, 3,3,3-trifluoropropyl groups, or similar halogenated alkyl groups, but methyl groups are preferred from the perspective of economic efficiency and heat resistance.

The molecular structure of the organopolysiloxane is not limited, however, are exemplified by straight chain, partially branched straight chain, and branched chain. The viscosity at 25° C. of the organopolysiloxane is not limited, however, it is preferably in a range of from about 100 to about 1,000,000 mPa s, alternatively in a range of from about 100 to about 100,000 mPa s, and alternatively in a range of from about 100 to about 10,000 mPa s.

Methods for synthesizing such organopolysiloxanes are known. The disclosures of U.S. Pat. Nos. 4,687,829 A, 4,711,928 A, 4,772,675 A, 4,871,827 A, 4,888,404 A and 4,898,910 A are incorporated herein by reference to show the preparation of the organopolysiloxanes.

The filler in component (A) is not limited, but it is typically selected from iron oxide, titanium oxide, aluminum oxide, zinc oxide, aluminum hydroxide, magnesium hydroxide, fused silica, crystalline silica, quart, diatomaceous earth, calcium carbonate, magnesium carbonate, zinc carbonate or a mixture thereof.

Component (A) is typically prepared by mixing the organopolysiloxane and the filler, in the present of a surface treating agent, under heating at 60 to 250° C., preferably under heating at 100 to 200° C.

The surface treating agent is not limited, but is exemplified by organodisilazane, alkenyl group-containing alkoxysilane, alkyl group-containing lkoxysilane, alkoxy-functional oligosiloxane, cyclic polyorganosiloxane, hydroxyl-functional oligosiloxane, organochlorosilane, or any combination of at least two thereof. The organodisilazane may be hexamethyldisilzane, 1,3-divinyl-trimethyldisilazane, or a mixture of any two or more thereof. The alkenyl group-containing alkoxysilane may be vinyl trimethoxysilane, methylvinyl dimethoxysilane, allyl trimethoxysilane, allylmethyl dimethoxysiane, or a mixture of any two or more thereof. The alkyl group-containing alkoxysilane may be hexyl trimethoxysilane, octyl triethoxysilane, decyl trimethoxysilane, dodecyl trimethoxysilane, tetradecyl trimethoxysilane, octadecyl trimethoxysilane, octadecyl triethoxysilane, or any combination of at least two thereof. The alkoxy-functional oligosiloxane may be $(CH_3O)_3Si[(OSi(CH_3)_2]C_8H_{17}$, $(CH_3O)_3Si[(OSi(CH_3)_2]_{10}C_8H_{17}$, $(CH_3O)_3Si[(OSi(CH_3)_2]C_{12}H_{25}$, $(CH_3O)_3Si[(OSi(CH_3)_2]_{10}C_{12}H_{25}$, or any combination of at least two thereof. The hydroxyl-functional oligosiloxane may be dimethyl siloxane or methyl phenyl siloxane. The organochlorosilane may be methyltrichlorosilane, diethyldichlorosilane, or trimethylchlorosilane.

An amount of the surface treating agent is any quantity sufficient for preparing the filler. The particular quantity may vary depending on factors such as the particular treating agent selected and the surface area and amount of untreated filler to be treated. The treating effective amount may range from 0.01 mass % to 20 mass %, alternatively 0.1 mass % to 15 mass %, and alternatively 0.5 mass % to 5 mass %, based on the mass of component (A).

Typically mechanics of the method comprises contacting and mixing ingredients with equipment suitable for the mixing. The equipment is not specifically restricted and may be, e.g., agitated batch kettles for relatively high flowability (low dynamic viscosity) compositions, a ribbon blender, solution blender, co-kneader, twin-rotor mixer, Banbury-type mixer, or extruder. The method may employ continuous compounding equipment, e.g., extruders such as extruders, twin screw extruders (e.g., Baker Perkins sigma blade mixer or high shear Turello mixer), may be used for preparing compositions containing relatively high amounts of particulates. The composition may be prepared in batch, semi-batch, semi-continuous, or continuous process. General methods are known, e.g., US 2009/0291238; US 2008/0300358.

Component (B) is a hydrophobic fumed silica with a BET specific surface area of from 100 to 400 m²/g, preferably of from 150 to 400 m²/g, alternatively of from 200 to 400 m²/g. This is because a thixotropic property of the curable silicone composition is improved when the BET specific surface area of the fumed silica is in the range above.

The content of component (B) is in an amount of from about 0.1 to about 50 parts by mass, preferably in an amount of from about 0.5 to about 30 parts by mass, alternatively in an amount of from about 1 to about 20 parts by mass, and alternatively in an amount of from about 1 to about 15 parts by mass, relative to 100 parts by mass of the organopolysiloxane in component (A). This is because when the content of component (B) is greater than or equal to the lower limit of the aforementioned range, the thixotropic property of the curable silicone composition is improved, and when the content of component (B) is less than or equal to the upper limit of the aforementioned range, handle-ability of the curable silicone composition is improved.

Component (C) is a carbasilatrane derivative represented by the following general formula:

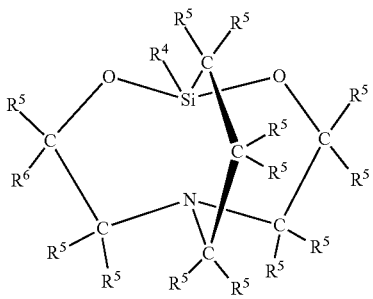

In the formula, $R^4$ is an alkyl group with 1 to 6 carbon atoms or an alkoxy group with 1 to 3 carbon atoms. The alkyl groups are exemplified by methyl groups, ethyl groups and propyl groups, however, methyl groups are preferred from the perspective of economic efficiency and heat resistance. The alkoxy groups are exemplified by methoxy groups, ethoxy groups and propoxy groups.

In the formula, $R^5$ are the same or different hydrogen atoms or alkyl groups with 1 to 6 carbon atoms. The alkyl groups are exemplified by methyl groups, ethyl groups, propyl groups, butyl groups, pentyl group and hexyl groups, however, methyl groups are preferred from the perspective of economic efficiency and heat resistance.

In the formula, $R^6$ are the same or different and are selected from groups represented by the following general formulae:

In the formula, $R^7$ is an alkyl group with 1 to 6 carbon atoms. The alkyl groups are exemplified by methyl groups, ethyl groups, propyl groups, butyl groups, pentyl group and hexyl groups, however, methyl groups are preferred.

In the formula, $R^8$ is an alkyl group with 1 to 3 carbon atoms. The alkyl groups are exemplified by methyl groups, ethyl groups and propyl groups.

In the formula, $R^9$ is an alkylene group with 2 to 6 carbon atoms or an alkylenoxyalkylene group with 4 to 12 carbon atoms. The alkylene groups are exemplified by ethylene groups, propylene groups, butylene groups, pentylene group, hexylene groups, heptylene groups and octylene groups, however, ethylene groups and propylene groups are preferred from the perspective of economic efficiency. The alkylenoxyalkylene groups are exemplified by ethylenoxyethylene groups, propylenoxyethylene groups, butylenoxypropylene groups and propylenoxypropylene group, however, ethylenoxypropylene groups and propylenoxypropylene groups are preferred from the perspective of economic efficiency.

In the formula, $R^{10}$ is an alkylene group with 2 to 6 carbon atoms. The alkylene groups are exemplified by ethylene groups, propylene groups, butylene groups, pentylene group, hexylene groups, heptylene groups and octylene groups, however, ethylene groups and propylene groups are preferred from the perspective of economic efficiency.

In the formula, $R^{11}$ is an alkyl group with 1 to 6 carbon atoms, an alkenyl group with 2 to 6 carbon atoms, or an acyl group with 2 to 6 carbo atoms. The alkyl groups are exemplified by vinyl groups, allyl groups, butenyl groups, pentenyl group and hexenyl groups, however, ally groups are preferred. The acyl groups are exemplified by acetyl groups, propionyl groups, acryl groups, methacryl groups, butyryl groups, isobutyryl groups, however, acetyl groups are preferred.

In the formula, "b" is 0, 1 or 2, and is preferably 0 or 1.

The carbasilatrane derivatives for component (C) are exemplified by compounds represented by the following formulae:

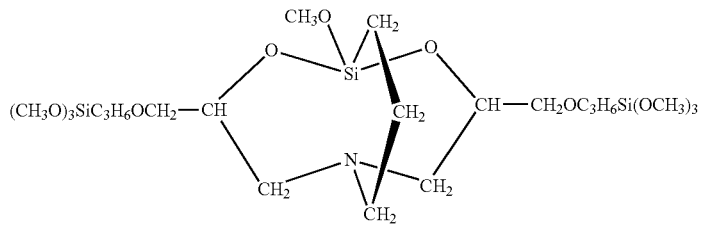

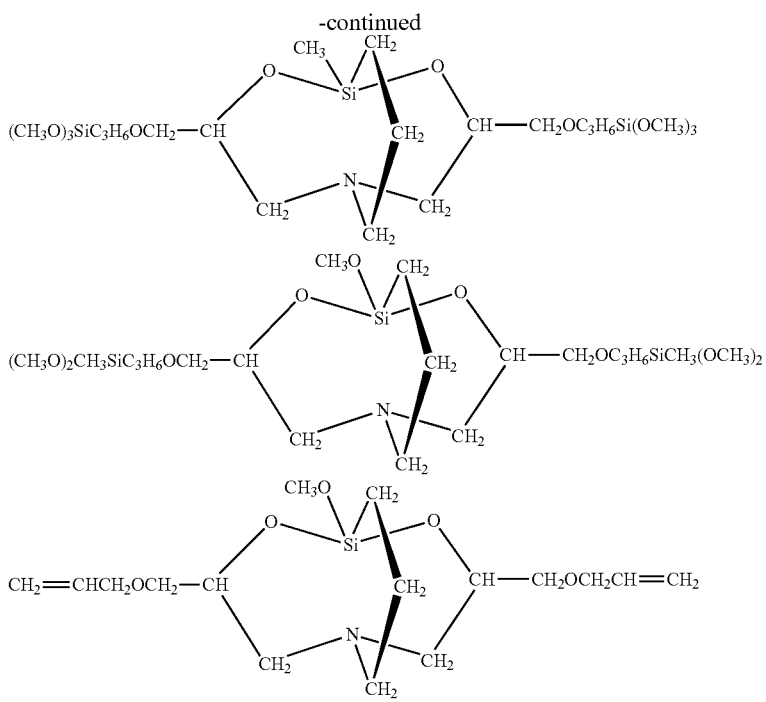

Methods for synthesizing such carbasilatrane derivatives are known. The disclosures of Japanese Patent No. 3831481 B2 and U.S. Pat. No. 8,101,677 B2 are incorporated herein by reference to show the preparation of the carbasilatrane derivatives.

A content of component (C) is in an amount of from about 0.1 to about 20 parts by mass, preferably in an amount of from about 1 to about 20 parts by mass, alternatively in an amount of from about 1 to about 10 parts by mass, relative to 100 parts by mass of the organopolysiloxane in component (A). This is because when the content of component (C) is greater than or equal to the lower limit of the aforementioned range, the thixotropic property of the curable silicone composition is improved, and when the content of component (C) is less than or equal to the upper limit of the aforementioned range, storage stability of the curable silicone composition is improved.

Component (D) functions as a crosslinking agent for the present composition, and is an alkoxysilane or its partial hydrolysis and condensation product, wherein the alkoxysilane is represented by the following general formula:

$R^1{}_c Si(OR^{13})_{(4-c)}$.

In the formula, $R^{12}$ is an alkyl group with 1 to 6 carbon atoms. The alkyl groups are exemplified by methyl groups, ethyl groups, propyl groups, butyl groups, pentyl group and hexyl groups, however, methyl groups are preferred.

In the formula, $R^{13}$ is an alkyl group with 1 to 3 carbon atoms. The alkyl groups are exemplified by methyl groups, ethyl groups and propyl groups.

In the formula, "c" is 0, 1 or 2.

Component (D) can be exemplified by trifunctional alkoxysilanes such as methyltrimethoxysilane, methyltriethoxysilane, ethyltrimethoxysilane, ethyltriethoxysilane, vinyltrimethoxysilane, and phenyltrimethoxysilane; by tetrafunctional alkoxysilanes such as tetramethoxysilane and tetraethoxysilane; and by the partial hydrolysis and condensation products of the preceding. A single alkoxysilane or partial hydrolysis and condensation product thereof may be used or a mixture of two or more may be used.

A content of component (D) is in an amount of from about 0.5 to about 30 parts by mass, preferably in an amount of from about 0.5 to about 20 parts by mass, alternatively in an amount of from about 1 to about 15 parts by mass, and alternatively in an amount of from about 5 to about 15 parts by mass, relative to 100 parts by mass of the organopolysiloxane in component (A). This is because when the content of component (D) is greater than or equal to the lower limit of the aforementioned range, the obtained composition exhibits a satisfactory curability and the shelf life of the obtained composition under moisture exclusion is enhanced, and when the content of component (D) is less than or equal to the upper limit of the aforementioned range, the obtained composition will cure rapidly under the effect of atmospheric moisture.

Component (E) is a condensation reaction catalyst that accelerates crosslinking in the present composition. Component (E) can be exemplified by tin compounds such as dimethyltin dineodecanoate and stannous octoate and by titanium compounds such as tetra(isopropoxy)titanium, tetra(n-butoxy)titanium, tetra(t-butoxy)titanium, di(isopropoxy)bis(ethyl acetoacetate)titanium, di(isopropoxy)bis(methyl acetoacetate)titanium, and di(isopropoxy)bis(acetylacetonate)titanium.

A content of component (E) is in an amount of from about 0.1 to about 10 parts by mass, alternatively in an amount of from about 0.5 to about 10 parts by mass, and alternatively in an amount of from about 0.5 to about 5 parts by mass, relative to 100 parts by mass of the organopolysiloxane in component (A). This is because when the content of component (E) is greater than or equal to the lower limit of the aforementioned range, the obtained composition exhibits a satisfactory curability under the effect of atmospheric moisture, and when the content of component (E) is less than or equal to the upper limit of the aforementioned range, the shelf life of the obtained composition under moisture exclusion is enhanced.

Insofar as the object of the present invention is not impaired, the curable silicone composition may contain other optional components, for example, a nonreinforcing filler such as calcium carbonate powder, diatomaceous earth powder, zinc carbonate powder; a flame retardant; a heat stabilizer; a plasticizer; and a pigment such as titan oxide, carbon black, and the like.

The method of the present invention comprises the following steps:
(I) mixing components (A) and (B),
(II) mixing component (C) with a mixture obtained by said step (I), and then
(III) mixing components (D) and (E) with a mixture obtained by said step (II) under free of moisture.

The step I is typically carried out at about 10 to about 50° C., alternatively at about 20 to about 35° C.

Then, the step II is typically carried out, preferred immediately after Step I, at about 10 to about 50° C., alternatively at about 20 to about 35° C.

Then, the step III is typically carried out at 10 to 50° C., alternatively at about 20 to about 35° C.

Typically mechanics of the method comprises contacting and mixing components with equipment suitable for the mixing. The equipment is not specifically restricted and may be, e.g., agitated batch kettles for relatively high flowability (low dynamic viscosity) compositions, a ribbon blender, solution blender, co-kneader, twin-rotor mixer, Banbury-type mixer, or extruder. The method may employ continuous compounding equipment, e.g., extruders such as extruders, twin screw extruders (e.g., Baker Perkins sigma blade mixer or high shear Turello mixer), may be used for preparing compositions containing relatively high amounts of particulates. The composition may be prepared in batch, semi-batch, semi-continuous, or continuous process.

Once prepared the composition may be used immediately or stored for any practical period, e.g., 1 hour or more, alternatively 1 day or more, alternatively 1 week or more, alternatively 30 days or more, alternatively 300 days or more, alternatively 2 years or more before use. The composition may be stored in a container that protects the composition from exposure to a cure trigger (e.g., triggering agent, e.g., water or lower alcohol) or triggering condition (e.g., heat, with or without water release agent). The storage may be at a suitable temperature (e.g., 40° C. or less, e.g., 25° C.) and under an inert gas atmosphere (e.g., $N_2$ or Ar gas), or both).

Then, when desired, curing (via the condensation reaction) of the composition may be initiated by exposing it to the cure trigger to give the cured material. For example, the cured material may be prepared by contacting the composition with an effective amount of a triggering agent (e.g., quantity of water, methanol, or ethanol), triggering effective condition (e.g., heat), or both so as to initiate a condensation reaction, which is catalyzed by the condensation catalyst for component (E). Exposure to ambient moisture may provide the triggering amount of water. The curing of the composition to a tack-free surface may occur at 25° C. in less than 2 hours, alternatively less than 1 hour, alternatively less than 20 minutes, alternatively less than 10 minutes, alternatively less than 5 minutes. If desired, curing may be performed at higher or lower temperatures for shorter or longer periods of time. Upon curing, the resulting cured material may form a gum, gel, rubber, or resin.

The composition and cured material are useful as the adhesive, alternatively the coating, alternatively the filler, alternatively the sealant. The composition and cured material may be readily incorporated onto or into the substrate of the manufactured article. The substrate may be wood, vinyl, fiberglass, aluminum, or glass. The manufactured article may be a building component (e.g., a window or door assembly), automotive, or electronic component. The article may be manufactured by filling a cavity in the substrate with the composition, or by applying the composition to at least an exterior or interior surface portion of the substrate by any suitable means such as by brushing, calendaring, dipping, drawing down, (co)extruding, rolling, spraying, or wiping, to give the article having the composition applied therein or thereon. If desired, the applied composition may then be cured in or on the substrate so as to make the manufactured article having the cured material.

EXAMPLES

The method of the present invention for producing the curable silicone composition will be described in detail hereinafter using Practical Examples and Comparative Examples. However, the present invention is not limited by the description of the below listed Practical Examples. Viscosities were measured at 25° C.

Slump of the composition was evaluated in accordance with ASTM D2202 as follows:
Place the clean flow jig face up on a flat level surface with the plunger depressed to the limit of its travel (⅜ in.). Fill the cavity with the sample. Level the surface with two passes of a blade, starting at the center and moving to one side of the jig. The loading operation should be completed within 0.5 min and with minimum amount of working of the sample. Immediately set the jig in a vertical position and advance the plunger to the limit of its forward travel and start the timer. Allow the jig to stand undisturbed for 3 hrs. The sample will have flowed down the face of the jig. Record the point of furthest advance using graduated scale. Report the result to the nearest tenth of an inch.

The following components were used to prepare the curable silicone compositions in Practical and Comparative Examples.

Component (a-1): a dimethylpolysiloxane having a viscosity of about 500 mPa·s and having on silicon atoms at both molecular chain terminals trimethoxysilylethyl-containing groups represented by the following formula:

—$C_2H_4$—$Si(CH_3)_2OSi(CH_3)_2$—$C_2H_4$—$Si(OCH_3)_3$.

Component (a-2): a dimethylpolysiloxane having a viscosity of about 12,000 mPa·s and having on silicon atoms at both molecular chain terminals trimethoxysilylethyl-containing groups represented by the following formula:

—$C_2H_4$—$Si(CH_3)_2OSi(CH_3)_2$—$C_2H_4$—$Si(OCH_3)_3$.

Component (a-3): an aluminum hydroxide powder having an average particle diameter of about 2 μm.

Component (a-4): an aluminum hydroxide powder having an average particle diameter of about 15 μm.

Component (a-5): a silica quart powder having an average particle diameter of about 4.3 μm.

Component (a-6): a fumed titanium dioxide powder having an average particle diameter of about 0.24 μm.

Component (a-7): vinyltrimethoxysilane

Component (b-1): hydrophobic fumed silica powder having a specific surface area by the BET method of about 200 m²/g and having a surface treated with hexamethyldisilazane.

Component (b-2): hydrophobic fumed silica powder having a specific surface area by the BET method of about 200 m²/g and having a surface treated with dimethyl dichlorosilane.

Component (b-3): hydrophilic fumed silica powder having a specific surface area by the BET method of about 200 m²/g.

Component (c-1): carbasilatrane derivative represented by the following formula:

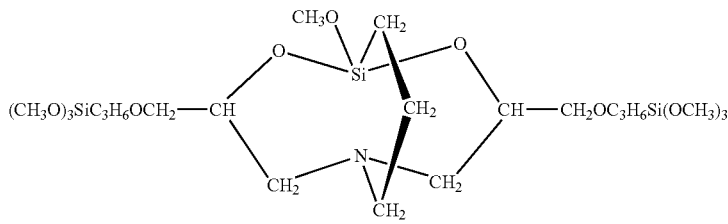

Component (c-2): 3-glycidoxypropyl trimethoxysilane
Component (d-1): methyltrimethoxysilane
Component (d-2): dimethyldimethoxysilane
Component (e-1): titanium diisopropoxy bis(ethyl acetoaceate)

[Reference Example 1] (Preparation of Silicone Base Material (1))

Silicone base material (1) was prepared by high shear mixing with a Turello type of high shear mixer, 63.7 part by mass of component (a-1), 36.3 parts by mass of component (a-2), 138.0 parts by mass of component (a-3), 72.4 parts by mass of component (a-4), 19.2 parts by mass of component (a-5), 5.4 parts by mass of component (a-6) and 4.3 parts by mass of component (a-7) at 25° C. until uniformly blended, then heating the blend under a vacuum of from –0.01 to –0.1 MPa at a temperature of from 120° C. to 200° C. and stripping of volatiles for from 30 minutes to 3 hours, and cooling the residual material to 25° C.

Practical Example 1

The silicone base material (1) obtained by Reference Example 1 was mixed with component (b-1), in an amount of 9.1 parts by mass per 100 parts by mass of components (a-1) and (a-2) in the silicone base material (1), at 25° C. until uniformly blended to obtain a mixture (1). The mixture (1) had a little bit flowability and had a slump of 16 mm.

Then, the mixture (1) was mixed with component (c-1), in an amount of 1.8 parts by mass per 100 parts by mass of components (a-1) and (a-2) in the mixture (1), at 25° C. until uniformly blended to obtain a mixture (2). The mixture (2) had non-flowability and had a slump of 0 mm.

Then, the mixture (2) was mixed under anhydrous atmosphere with components (d-1), (d-2) and (e-1), in an amount of 5.8 parts by mass, 4.0 parts by mas and 4.0 parts by mass, relative to 100 parts by mass of components (a-1) and (a-2) in the mixture (2), respectively, at 25° C. until uniformly blended to obtain a curable silicone composition. The curable silicone composition had non-flowability and had a slump of 3 mm.

Practical Example 2

The mixture (1) obtained in Practical Example 1 was mixed with component (c-1), in an amount of 18 parts by mass per 100 parts by mass of components (a-1) and (a-2) in the mixture (1), at 25° C. until uniformly blended to obtain a mixture (3). The mixture (3) had non-flowability and had a slump of 0 mm.

Then, the mixture (3) was mixed under anhydrous atmosphere with components (d-1), (d-2) and (e-1), in an amount of 5.8 parts by mass, 4.0 parts by mas and 4.0 parts by mass, relative to 100 parts by mass of components (a-1) and (a-2) in the mixture (3), respectively, at 25° C. until uniformly blended to obtain a curable silicone composition. The curable silicone composition had non-flowability and had a slump of 4 mm.

Practical Example 3

The silicone base material (1) obtained by Reference Example 1 was mixed with component (b-2), in an amount of 9.1 parts by mass per 100 parts by mass of components (a-1) and (a-2) in the silicone base material (1), at 25° C. until uniformly blended to obtain a mixture (4). The mixture (4) had non-flowability and had a slump of 0.5 mm.

Then, the mixture (4) was mixed with component (c-1), in an amount of 1.8 parts by mass per 100 parts by mass of components (a-1) and (a-2) in the mixture (1), at 25° C. until uniformly blended to obtain a mixture (5). The mixture (5) had non-flowability and had a slump of 0 mm.

Then, the mixture (5) was mixed under anhydrous atmosphere with components (d-1), (d-2) and (e-1), in an amount of 5.8 parts by mass, 4.0 parts by mas and 4.0 parts by mass, relative to 100 parts by mass of components (a-1) and (a-2) in the mixture (5), respectively, at 25° C. until uniformly blended to obtain a curable silicone composition. The curable silicone composition had a little bit flowability and had a slump of 16 mm.

Comparative Example 1

The mixture (1) obtained by Practical Example 1 was mixed under anhydrous atmosphere with components (d-1), (d-2) and (e-1), in an amount of 5.8 parts by mass, 4.0 parts by mas and 4.0 parts by mass, relative to 100 parts by mass of components (a-1) and (a-2) in the mixture (1), respectively, at 25° C. until uniformly blended to obtain a curable silicone composition. The curable silicone composition had flowability and had a slump of 46 mm.

Comparative Example 2

The silicone base material (1) obtained by Reference Example 1 was mixed with component (b-3), in an amount of 9.1 parts by mass per 100 parts by mass of components (a-1) and (a-2) in the silicone base material (1), at 25° C. until uniformly blended to obtain a mixture (6). The mixture (6) had a little bit flowability and had a slump of 9 mm.

Then, the mixture (6) was mixed with component (c-1), in an amount of 1.8 parts by mass per 100 parts by mass of components (a-1) and (a-2) in the mixture (6), at 25° C. until uniformly blended to obtain a mixture (7). The mixture (7) had flowability and had a slump of over 100 mm.

Then, the mixture (7) was mixed under anhydrous atmosphere with components (d-1), (d-2) and (e-1), in an amount of 5.8 parts by mass, 4.0 parts by mas and 4.0 parts by mass, relative to 100 parts by mass of components (a-1) and (a-2) in the mixture (7), respectively, at 25° C. until uniformly blended to obtain a curable silicone composition. The curable silicone composition had flowability and had a slump of over 100 mm.

Comparative Example 3

The mixture (1) obtained by Practical Example 1 was mixed with component (c-2), in an amount of 1.8 parts by mass per 100 parts by mass of components (a-1) and (a-2) in the mixture (1), at 25° C. until uniformly blended to obtain a mixture (8). The mixture (8) had a little bit flowability and had a slump of 38 mm.

Then, the mixture (8) was mixed under anhydrous atmosphere with components (d-1), (d-2) and (e-1), in an amount of 5.8 parts by mass, 4.0 parts by mas and 4.0 parts by mass, relative to 100 parts by mass of components (a-1) and (a-2) in the mixture (8), respectively, at 25° C. until uniformly blended to obtain a curable silicone composition. The curable silicone composition had flowability and had a slump of 57 mm.

INDUSTRIAL APPLICABILITY

According to the method of the present invention, the thixotropic curable silicone composition obtained by the method has an excellent thixotropic property and can cure at room temperature by contact with moisture in air. Therefore, the curable silicone composition is useful, in sealants, adhesives, or coatings of an electric/electronic apparatus.

The invention claimed is:

1. A method for producing a curable silicone composition, the curable silicone composition comprising:

(A) a silicone base material comprising:

100 parts by mass of an organopolysiloxane having in a molecule at least two alkoxysilyl-containing groups represented by the following formula:

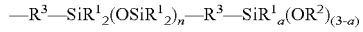

wherein $R^1$ are the same or different alkyl groups with 1 to 6 carbon atoms, $R^2$ are the same or different alkyl groups with 1 to 3 carbon atoms, $R^3$ are the same or different alkylene groups with 2 to 6 carbon atoms, "a" is 0 or 1, and "n" is an integer of from 1 to 10; and from 100 to 500 parts by mass of filler other than fumed silica;

(B) a hydrophobic fumed silica with a BET specific surface area of from 100 to 400 m²/g;

(C) a carbasilatrane derivative represented by the following general formula:

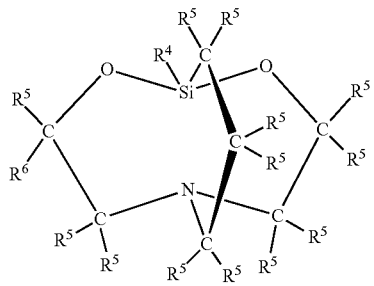

wherein $R^4$ is an alkyl group with 1 to 6 carbon atoms or an alkoxy group with 1 to 3 carbon atoms, $R^5$ are the same or different hydrogen atoms or alkyl groups with 1 to 6 carbon atoms, and $R^6$ are the same or different and are selected from groups represented by the following general formulae:

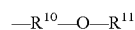

wherein $R^7$ is an alkyl group with 1 to 6 carbon atoms, $R^8$ is an alkyl group with 1 to 3 carbon atoms, $R^9$ is an alkylene group with 2 to 6 carbon atoms or an alkylenoxyalkylene group with 4 to 12 carbon atoms, $R^{10}$ is an alkylene group with 2 to 6 carbon atoms, $R^{11}$ is an alkyl group with 1 to 6 carbon atoms, an alkenyl group with 2 to 6 carbon atoms or an acyl group with 2 to 6 carbon atoms, and "b" is 0, 1 or 2;

(D) an alkoxysilane or its partial hydrolysis and condensation product, wherein the alkoxysilane is represented by the following general formula:

wherein $R^{12}$ is an alkyl group with 1 to 6 carbon atoms, $R^{13}$ is an alkyl group with 1 to 3 carbon atoms, and "c" is 0, 1 or 2; and (E) a condensation reaction catalyst;

wherein a content of component (B) is in an amount of from 0.1 to 50 parts by mass, a content of component (C) is in an amount of from 0.1 to 20 parts by mass, a content of component (D) is in an amount of from 0.5 to 30 parts by mass, and a content of component (E) is in an amount of from 0.1 to 10 parts by mass, relative to 100 parts by mass of the organopolysiloxane in component (A), respectively; and wherein the method comprises the following steps:

(I) mixing components (A) and (B);
(II) mixing component (C) with a mixture obtained by said-step (I); and
(III) mixing components (D) and (E) with a mixture obtained by step (II) under free of moisture.

2. The method according to claim 1, wherein the filler in component (A) is selected from the group consisting of iron oxide, titanium oxide, aluminum oxide, zinc oxide, aluminum hydroxide, magnesium hydroxide, fused silica, crystalline silica, quart, diatomaceous earth, calcium carbonate, magnesium carbonate, zinc carbonate, and mixtures thereof.

3. The method according to claim 1, wherein component (A) is prepared by mixing the organopolysiloxane and the filler, in the presence of a surface treating agent, under heating at 60 to 250° C.

4. The method according to claim 3, wherein the surface treating agent is selected from the group consisting of a hexamethyldisilazane, a tetramethyl divinyl disilazane, and a vinyl trimethoxysilane.

5. The method according to claim 1, wherein component (C) is a carbasilatrane derivative represented by the following formula:
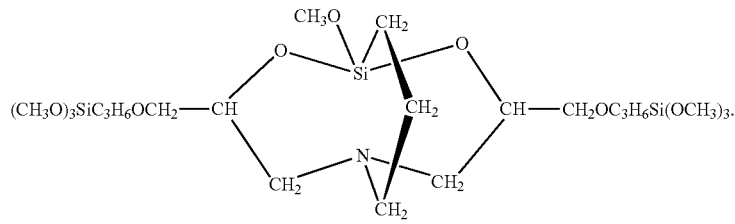
6. The method according to claim 1, wherein step (I) is carried out at 10 to 50° C.
7. The method according to claim 1, wherein step (II) is carried out at 10 to 50° C.
8. The method according to claim 1, wherein step (III) is carried out at 10 to 50° C.
* * * * *